(12) United States Patent
Amadio et al.

(10) Patent No.: US 8,578,290 B2
(45) Date of Patent: Nov. 5, 2013

(54) DOCKING AND UNDOCKING USER INTERFACE OBJECTS

(75) Inventors: Louis Amadio, Sammamish, WA (US); Paul Erickson, Sammamish, WA (US); Oliver Fisher, Ottawa (CA); Keira Amos, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 1132 days.

(21) Appl. No.: 11/206,022

(22) Filed: Aug. 18, 2005

(65) Prior Publication Data

US 2007/0044035 A1 Feb. 22, 2007

(51) Int. Cl.
*G06F 3/048* (2013.01)

(52) U.S. Cl.
USPC ........... 715/778; 715/767; 715/772; 715/777; 715/779; 715/781; 715/783; 715/790; 715/792; 715/798; 715/799; 715/801; 715/805; 715/842

(58) Field of Classification Search
USPC ......... 715/781, 779, 767, 772, 777, 778, 783, 715/790, 792, 798, 799, 801, 805, 842
See application file for complete search history.

(56) References Cited

U.S. PATENT DOCUMENTS

| | | | | |
|---|---|---|---|---|
| 5,129,052 A | * | 7/1992 | Barker et al. | 715/234 |
| 5,146,556 A | * | 9/1992 | Hullot et al. | 715/790 |
| 5,644,737 A | * | 7/1997 | Tuniman et al. | 715/810 |
| 5,808,610 A | * | 9/1998 | Benson et al. | 715/788 |
| 5,819,055 A | * | 10/1998 | MacLean et al. | 715/798 |
| 5,883,626 A | * | 3/1999 | Glaser et al. | 715/788 |
| 5,917,483 A | * | 6/1999 | Duncan et al. | 715/802 |
| 5,937,417 A | * | 8/1999 | Nielsen | 715/207 |
| 6,029,175 A | * | 2/2000 | Chow et al. | 1/1 |
| 6,031,530 A | * | 2/2000 | Trueblood | 715/791 |
| 6,052,456 A | * | 4/2000 | Huang | 379/201.04 |
| 6,057,834 A | * | 5/2000 | Pickover | 715/846 |
| 6,154,771 A | * | 11/2000 | Rangan et al. | 709/217 |
| 6,232,971 B1 | * | 5/2001 | Haynes | 715/800 |
| 6,259,461 B1 | * | 7/2001 | Brown | 345/556 |
| 6,262,724 B1 | * | 7/2001 | Crow et al. | 715/723 |
| 6,311,221 B1 | * | 10/2001 | Raz et al. | 709/231 |
| 6,353,451 B1 | * | 3/2002 | Teibel et al. | 715/803 |
| 6,686,938 B1 | * | 2/2004 | Jobs et al. | 715/835 |
| 6,693,652 B1 | * | 2/2004 | Barrus et al. | 715/838 |
| 6,717,593 B1 | * | 4/2004 | Jennings | 715/760 |
| 6,928,620 B1 | * | 8/2005 | Crangle et al. | 715/769 |
| 7,019,743 B1 | * | 3/2006 | Wainwright et al. | 345/420 |
| 7,277,912 B2 | * | 10/2007 | Corboy et al. | 709/203 |

(Continued)

OTHER PUBLICATIONS

Robert Cowart, Mastering Windows 95, 1995, Sybex, pp. 36, 336-338.*

(Continued)

*Primary Examiner* — Boris Pesin
*Assistant Examiner* — John Heffington
(74) *Attorney, Agent, or Firm* — Senniger Powers LLP

(57) ABSTRACT

The present invention relates to a system and method for displaying information or a part within a second application, such as a sidebar application. The part can be docked in the sidebar application or undocked from the sidebar application and can send corresponding docking messages in a docking protocol to the sidebar application based on the docking status of the part or the location of the part in relation to the sidebar application. Graphically depicted animations indicate to a user the docking and/or undocking processes.

15 Claims, 9 Drawing Sheets

(56) References Cited

U.S. PATENT DOCUMENTS

| | | | |
|---|---|---|---|
| 7,325,204 B2* | 1/2008 | Rogers | 715/792 |
| 7,681,134 B1* | 3/2010 | Grechishkin et al. | 715/740 |
| 2002/0008719 A1* | 1/2002 | Miyawaki et al. | 345/764 |
| 2002/0080170 A1* | 6/2002 | Goldberg et al. | 345/748 |
| 2002/0135621 A1* | 9/2002 | Angiulo et al. | 345/838 |
| 2002/0144014 A1* | 10/2002 | West | 709/318 |
| 2002/0161837 A1* | 10/2002 | Sasaki et al. | 709/204 |
| 2002/0186257 A1* | 12/2002 | Cadiz et al. | 345/838 |
| 2003/0058286 A1* | 3/2003 | Dando | 345/853 |
| 2003/0120731 A1* | 6/2003 | Weinberg et al. | 709/205 |
| 2003/0189597 A1* | 10/2003 | Anderson et al. | 345/778 |
| 2004/0003096 A1* | 1/2004 | Willis | 709/228 |
| 2004/0056894 A1* | 3/2004 | Zaika et al. | 345/762 |
| 2004/0056900 A1* | 3/2004 | Blume | 345/807 |
| 2004/0212640 A1* | 10/2004 | Mann et al. | 345/792 |
| 2004/0261037 A1* | 12/2004 | Ording et al. | 715/788 |
| 2005/0044058 A1* | 2/2005 | Matthews et al. | 707/1 |
| 2005/0044491 A1* | 2/2005 | Peterson | 715/517 |
| 2005/0060664 A1* | 3/2005 | Rogers | 715/810 |
| 2005/0125739 A1* | 6/2005 | Thompson et al. | 715/778 |
| 2005/0251753 A1* | 11/2005 | Sawyer | 715/765 |
| 2006/0010394 A1* | 1/2006 | Chaudhri et al. | 715/779 |
| 2006/0015818 A1* | 1/2006 | Chaudhri et al. | 715/779 |
| 2006/0286534 A1* | 12/2006 | Tillis et al. | 434/350 |
| 2009/0183120 A1* | 7/2009 | Ording et al. | 715/823 |

OTHER PUBLICATIONS

Snippets Product Overview. Downloaded from www.snippets.com Jun. 11, 2001.

Printout of representative pages from www.snippets.com website: Jun. 11, 2001.

Printout of representative pages from www.infogate.com website: Jun. 11, 2001.

The Octopus Platform. Downloaded from www.octopus.com Jun. 11, 2001.

Multiplying enterprise Application ROI, An Octopus Whitepaper. Apr. 2001, Downloaded from www.octopus.com Jun. 11, 2001.

Printout of representative pages from www.dodots.com website: Jun. 11, 2001.

Printout of representative pages from www.enfish.com website: Jun. 11, 2001.

S. Parsowith, et al. "Tickertape: Notification and Communication in a Single Line". Publication date unknown.

N. Marmasse. "Commotion: a context-aware communication system". In Proceedings of CHI, 1999.

S. Greenberg and M. Rounding, "The Notification Collage: Posting Information to Public and Personal displays", Yellow Series Report 2000-667-19, Department of Computer Science, University of Calgary, Alberta, Canada. Publication date unknown.

BotKnowledge, "InfoGate Review", 2000. "www.botknowledge.com/infogatereview.html", 1 page.

Konfabulator, Version 2.1.1., Aug. 3, 2005 at www.konfabulator.com, downloaded Nov. 15, 2005.

Corporate Portals Letter, vol. 1, No. 10, Oct. 2000, 3 pages.

Delaney, Kevin J., (Wall Street Journal) Google Helps Clients Get Personal, Aug. 22, 2005, 1-3 Pages.

Google debuts,, Google Gadgets, May 10, 2006, 1-2 pages.

Google, Sidebar to Launch Monday Aug. 21, 2005, 1-8 pages.

Ziff Davis Media Inc., Apple Previews Mac OSX "Tiger", Jun. 28, 2004, 8 pages.

Ziff Davis Media Inc., Mac 'widget' App Set to Make Windows Debut, Nov. 8, 2004, 1-4 pages.

* cited by examiner

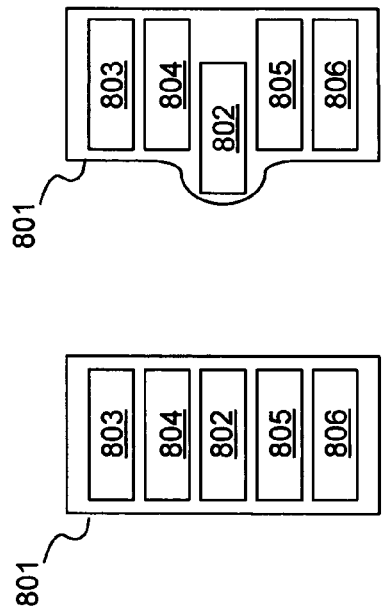
FIG. 9A
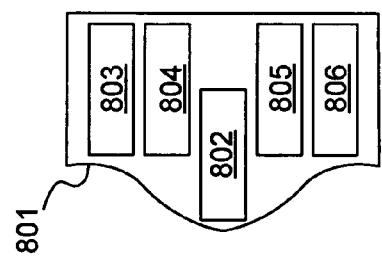
FIG. 9B
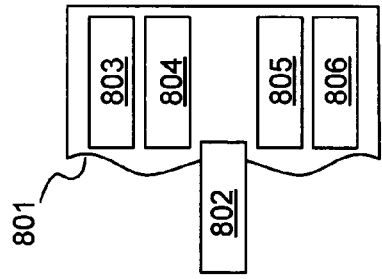
FIG. 9C
FIG. 9D
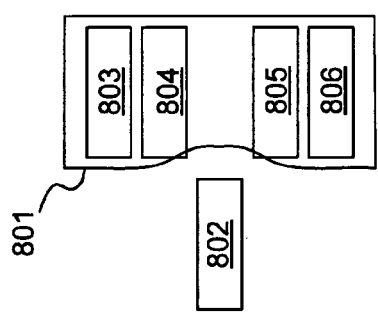
FIG. 9E
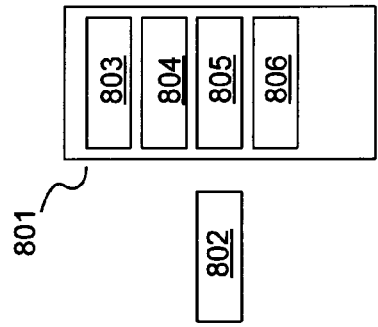
FIG. 9F

DOCKING AND UNDOCKING USER INTERFACE OBJECTS

BACKGROUND

A computer can be used to run a large variety of applications, each of which provides a user interface (UI) in which a user may obtain information and/or input data. These user interfaces associated with each application often can be moved within a computer display such that the location of the UIs on the computer displayed can be controlled. Each UI may be displayed in a pane displayed on the desktop UI. For example, a user can move a UI pane associated with an application to a particular location on a computer display so that the UI can be displayed at the desired location.

A user may decide to use a predetermined location on a computer display for displaying the user interfaces associated with corresponding applications. For example, a user can move a UI pane to one side of the computer desktop and a second UI pane next to the first UI pane on the desktop. However, these UI panes can merely be placed on a computer desktop but cannot be hosted on another application or automatically arranged within another application. Hosting or docking a UI pane on another application can be advantageous for purposes of manipulation, organization and/or display of the UI's. Currently, computer users have not been able dock or undock UI's onto such an application to efficiently arrange, manipulate or access information provided in the UI's.

Thus, there exists a need in the art for a system and method for hosting, docking or undocking UI's on an application. There is also a need to provide docking and undocking of UI's in an easy-to-use and user-friendly manner.

SUMMARY OF THE INVENTION

The following presents a simplified summary of the invention in order to provide a basic understanding of some aspects of the invention. This summary is not an extensive overview of the invention. It is not intended to identify key or critical elements of the invention or to delineate the scope of the invention. The following summary merely presents some concepts of the invention in a simplified form as a prelude to the more detailed description provided below.

To overcome limitations in the prior art described above, and to overcome other limitations that will be apparent upon reading and understanding the present specification, various features described herein are directed to the display of content of an application within the display area of another application, and docking and undocking of an application in another application.

In one aspect, a method and system is provided for launching an application on a computer and displaying a window corresponding to the application. The window of the application may be moved on the display toward a window corresponding to a second application. When the window of the application overlaps at least a portion of the window of the second application, the window of the application can be docked into the window of the second application.

In another aspect, the first application can send docking or undocking messages to the second application in a docking protocol. Based on the messages sent and received, the display of the first application can be docked or undocked in relation to the second application.

In another aspect, the second application is a sidebar on a computer display and the first application is a part, "gadget" or "widget." The part can be docked in the sidebar on a computer display. Multiple parts can be docked into the sidebar application and any of the parts can be undocked from the sidebar application. When parts are docked or undocked from the sidebar application, the sidebar application can also display an animation to indicate the docking and undocking of the parts.

BRIEF DESCRIPTION OF THE DRAWINGS

FIGS. 9A-9F illustrate an example of an animation to indicate undocking of a part from a sidebar according to one or more illustrative features described herein.

DETAILED DESCRIPTION

Figure 1:
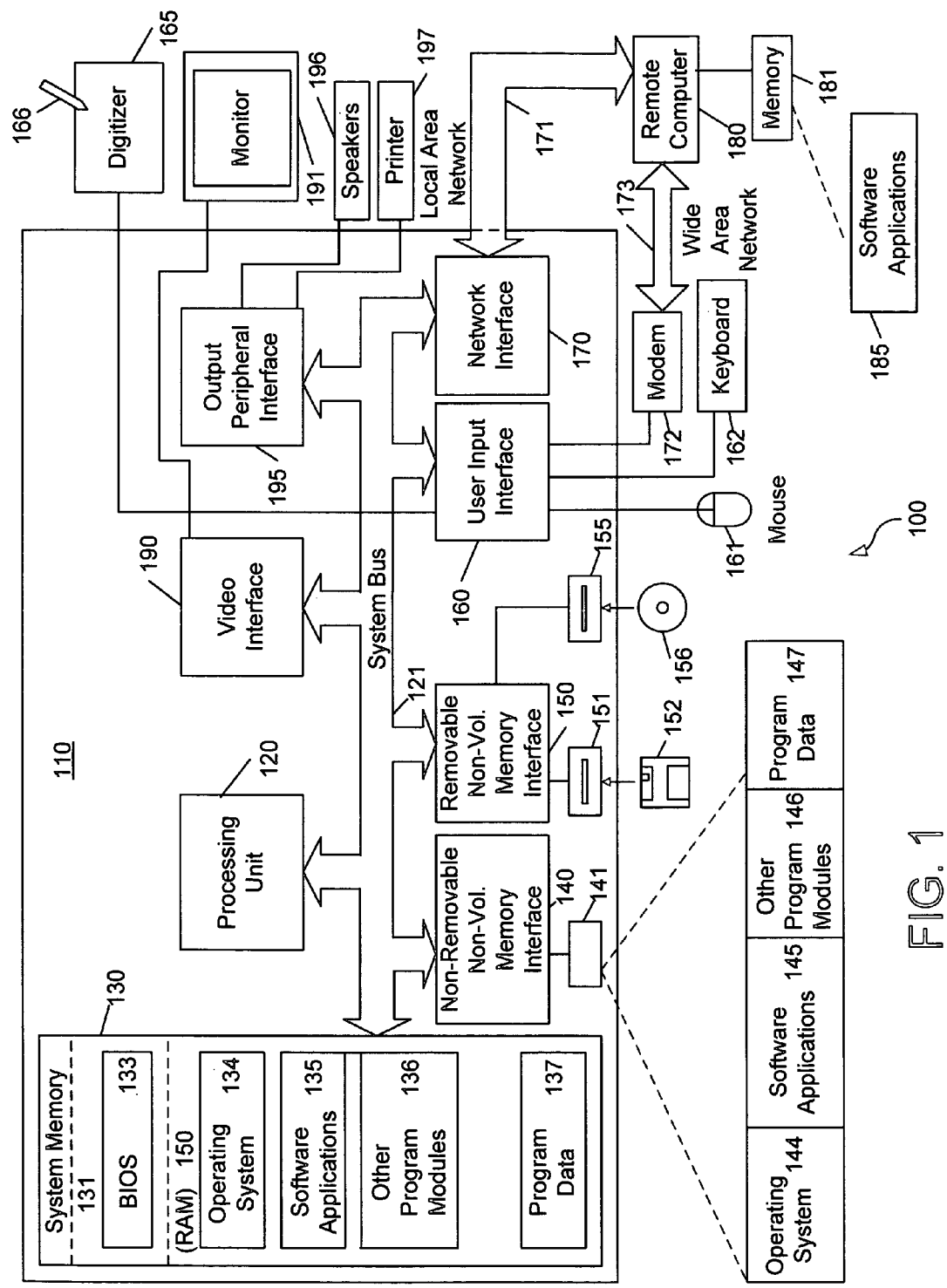
FIG. 1 illustrates an example of a system for implementing one or more features described herein which includes a general purpose computing device in the form of a computer.

Various aspects of the present invention may be implemented in any variety of operating environments. FIG. 1 illustrates an example of a suitable operating environment 100 in which aspects of the present invention may be implemented. The operating environment 100 is only one example of a suitable operating environment and is not intended to suggest any limitation as to the scope of use or functionality of the invention. Other well known computing systems, environments, and/or configurations that may be suitable for use with the invention include, but are not limited to, personal computers, server computers, hand-held or laptop devices, multiprocessor systems, microprocessor-based systems, programmable consumer electronics, network PCs, minicomputers, mainframe computers, distributed computing environments that include any of the above systems or devices, and the like.

FIG. 1 illustrates an example of a suitable computing system environment 100 on which the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well known computing systems, environments, and/or configurations that may be suitable for use with the invention include, but are not limited to, personal computers, server computers, hand-held or laptop devices, multiprocessor systems, microprocessor-based systems, programmable consumer electronics, network PCs, minicomputers, mainframe computers, distributed computing environments that include any of the above systems or devices, and the like.

With reference to FIG. 1, an illustrative system for implementing the invention includes a general purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 110 typically includes a variety of computer readable media. Computer readable media includes both volatile and nonvolatile media, removable and non-removable media. By way of example, and not limitation, computer readable media may comprise computer storage media and communication media and includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable, volatile/nonvolatile computer storage media. By way of example only, FIG. 1 illustrates a hard disk drive 140 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through an non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer 20 through input devices such as a keyboard 162 and pointing device 161, commonly referred to as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through a output peripheral interface 190.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

According to an illustrative aspect, a system and method is provided for displaying an application on a computer display in which information is provided within an application window. Additional information may be added to the application window or information already on the application window may be removed from the application window. There are many examples of application windows that may be used in the present invention. For example, the application window may be a persistent display area on the display. Such a persistent display area may be a delineated, predetermined area on the display corresponding to an application that can host UIs. In one example, the persistent display area is a rectangular-shaped area located at a side of the display. This display area can be termed a "sidebar." The sidebar may alternatively be located anywhere on the desktop or display such as along a top side or bottom side of a display and can be of any shape or configuration.

With a sidebar, information can be displayed within the application window of the sidebar. Sidebars are particularly useful for displaying updated information, particularly if the information is subject to frequent changes. For example, a user may wish to receive up-to-the-minute information on weather conditions in various geographic locations, stock quote information for securities of interest, sports scores of ongoing games, time of day, etc. Such information may be provided in the sidebar.

Figure 2:
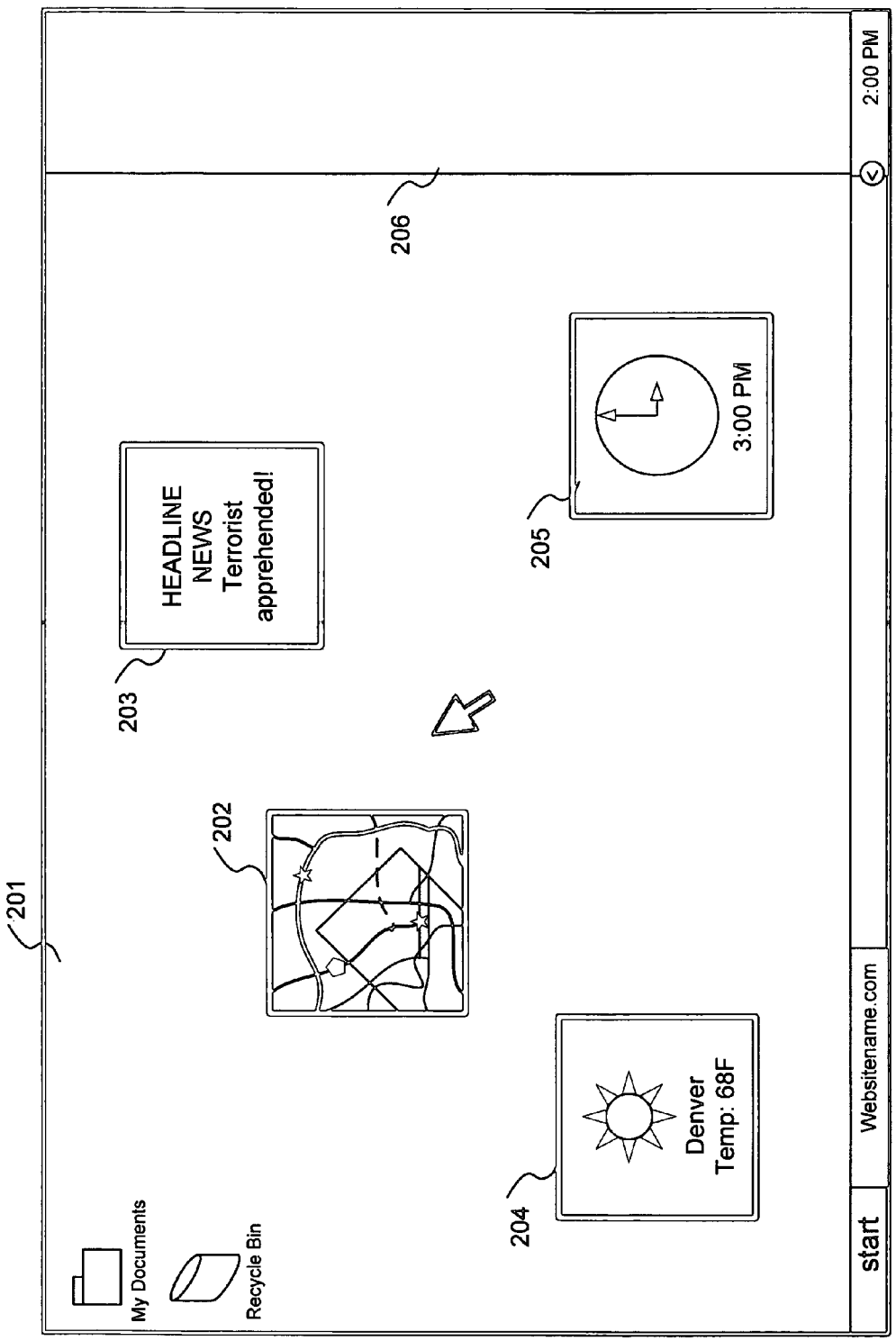
FIG. 2 illustrates an example of parts displayed on a computer desktop according to one or more illustrative features described herein.

Applications containing such desired information can be provided in the sidebar. These applications are sometimes referred to as "gadgets," "widgets" or "parts" within the sidebar and may contain any of a variety of data files such as but not limited to ZIP files or CAB files. The parts (or gadgets or widgets) can be hosted within the sidebar application (or any remote execution environment including but not limited to, for example, a Terminal Services Desktop or a Virtual PC Desktop) such that the parts can be docked in the sidebar application window. For example, FIG. 2 illustrates an example of parts displayed on a computer desktop 201. In this example, there are four parts, a traffic part 202 that provides traffic information in an undocked application window, a news part 203 that provides information on news events in an undocked application window, a weather part 204 that provides weather information in an undocked application window, and a time part 205 that provides the current time in a desired time zone. Also displayed on the desktop 201 is a sidebar 206. Each of the four parts (202, 203, 204, and/or 205) in this example is displayed in a random undocked configuration on the desktop 201. If a large application window (not shown) were to be opened on the desktop 201, many of the parts (202, 203, 204 and/or 205) would be obscured by the large application window.

According to an illustrative aspect, a docking protocol may be used to dock or undock applications, such as parts, on another application, such as sidebar 206. A docking protocol may comprise the exchange of messages between applications (e.g., a part and the sidebar) to permit docking of at least one of the applications to another application or undocking of at least one of the applications from the other application. For example, a free-floating application window (e.g., a part) that is displayed on a computer desktop can communicate messages to the hosting application (e.g., the sidebar application) so that the hosting application can permit the free-floating application window to dock on the hosting application window.

As an example of docking of a free-floating application to a hosting application using a docking protocol, a part can be dragged to a sidebar application from a separate location. The part can send a message to the sidebar application to inform the sidebar application that the part application window is approaching the sidebar application window. The docking protocol is described below in greater detail.

Figure 3:
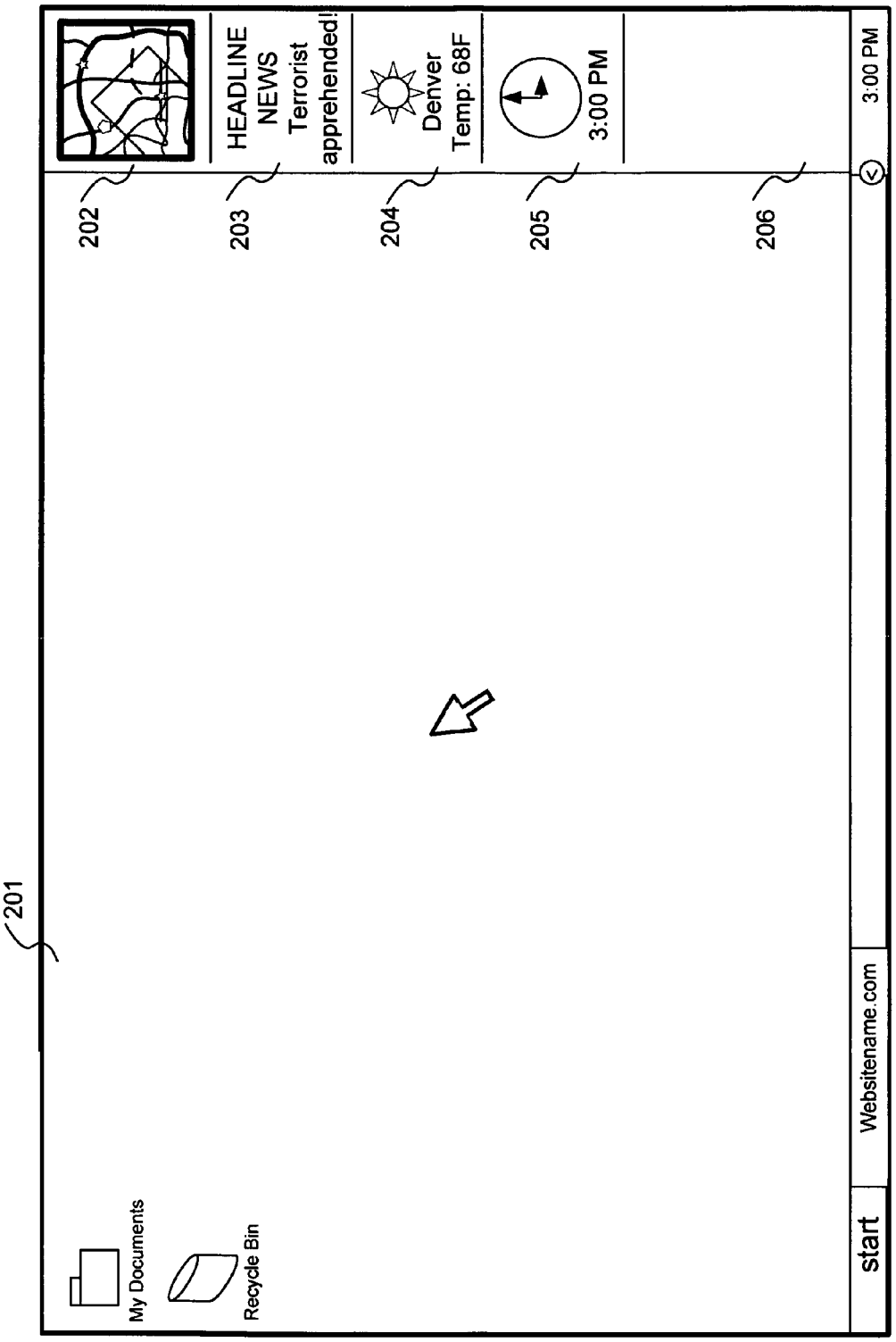
FIG. 3 illustrates a computer desktop of FIG. 2 containing parts according to one or more illustrative features described herein.

FIG. 3 illustrates the computer desktop of FIG. 2 in which parts have been docked in a sidebar application. In this example of the present invention, each of the parts have been dragged and dropped onto the sidebar application window 206. As FIG. 3 illustrates, the traffic part 202, the news part 203, the weather part 204 and the time part 205 have all been dragged and dropped into the sidebar application window 206 such that each of the parts have been docked in the sidebar application window 206.

Figure 4:
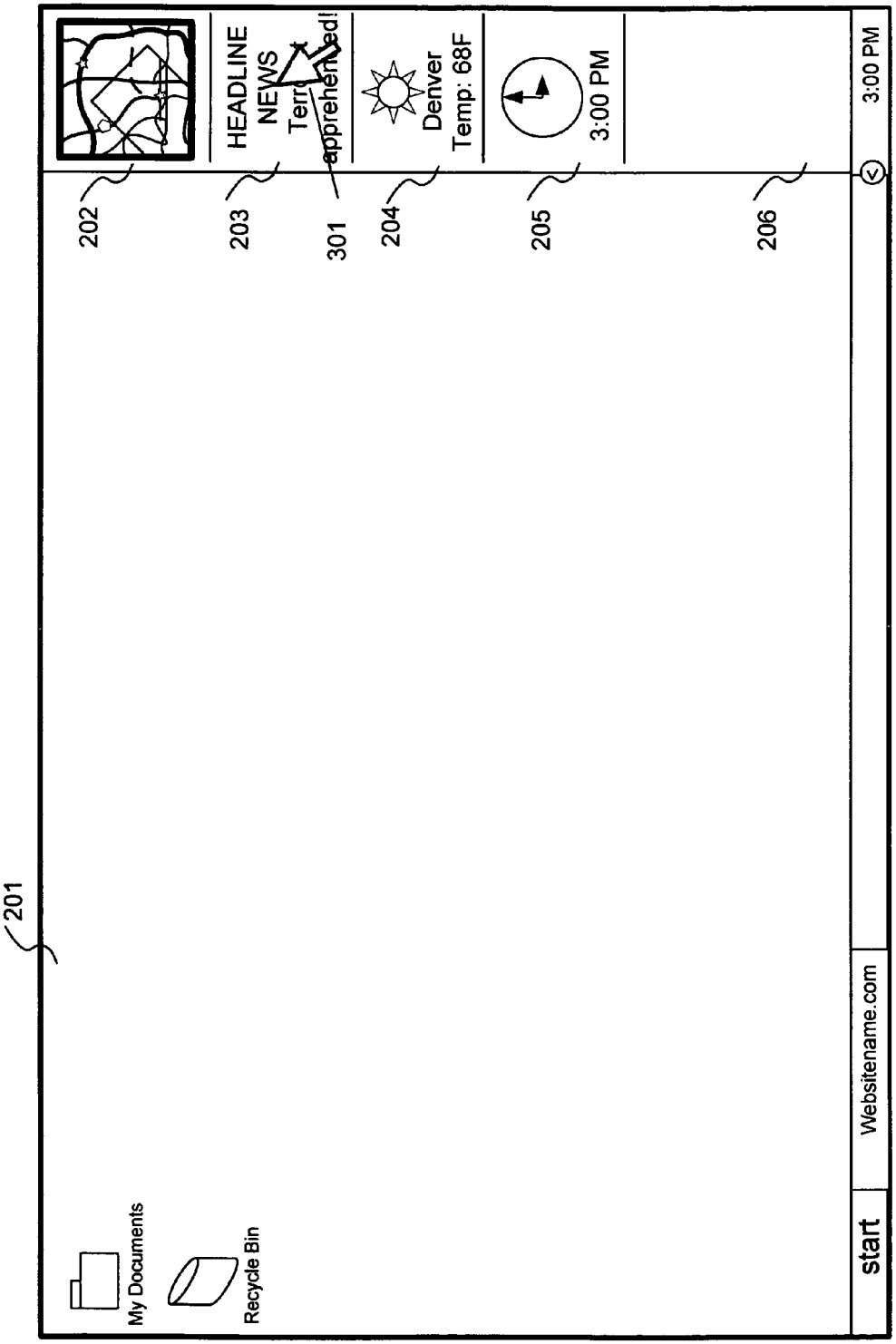
FIG. 4 illustrates an example of undocking a part from a sidebar according to one or more illustrative features described herein.

Parts docked on the sidebar application window can also be undocked from the sidebar. FIG. 4 illustrates an example of undocking a part from a sidebar. In this example, a cursor 301 is placed over the news part 203 in the sidebar 206. The news part 203 may be moved (i.e., dragged) from the sidebar application window 206 to an alternate location by selecting the news part 203 using a mouse or similar input device, and dragging and dropping the news part 203 to a desired undocked location on the desktop 201.

Figure 5:
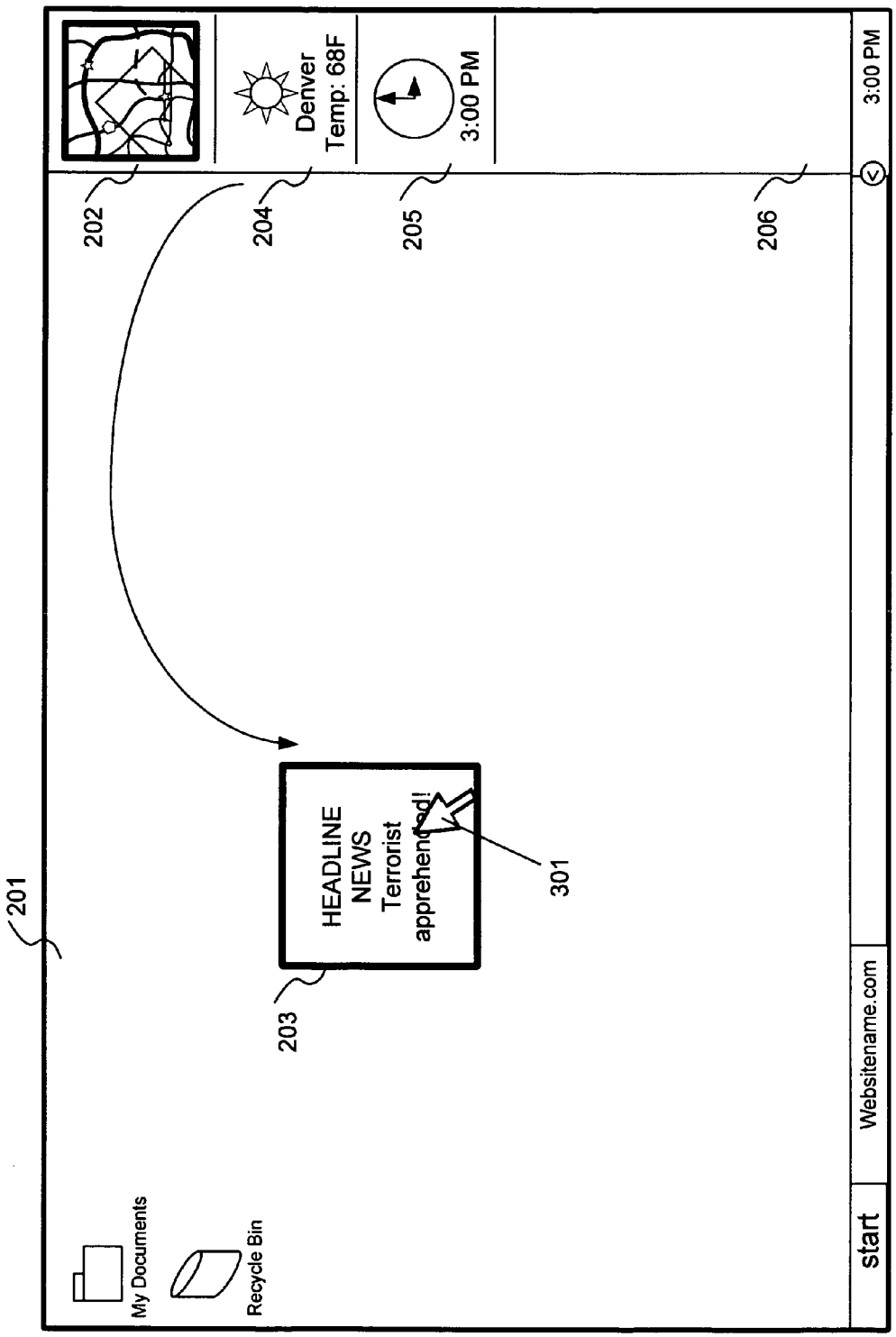
FIG. 5 illustrates the example of FIG. 4 in which a part is been dragged from a sidebar to the desktop according to one or more illustrative features described herein.

FIG. 5 illustrates the example of FIG. 4 in which the news part 203 has been dragged from the sidebar 206 to the desktop 201. In this example, the cursor 301 is used to select the news part 203 in the sidebar 206. The news part 203 is then dragged by the cursor 301 out of the sidebar 206 application window and onto the desktop 201 or any other desired location. The hosting application (e.g., the sidebar) may rearrange the parts remaining in the sidebar 206 application window after the news part 203 is removed.

Applications may be hosted by another application (i.e., may dock onto another application) and may also be undocked from the other application in a variety of ways as described herein. Also, one application may startup or shutdown in relation to another application. The application that is starting up or shutting down can communicate its status to the hosting application through the use of a docking protocol that may specify messages that are sent from one application to another. As an example, a part can send messages to a sidebar application window by first locating the sidebar window. Location of the sidebar window may be accomplished, for example, by using Win32 API FindWindow ("SideBar_ApBarWindow", NULL). After the sidebar application window is located, the part can send all of its docking messages to this located window as well as the "Instance" id (in the wParam) and the Window handle (in the lparam).

A part may start up while docked onto the sidebar application in which case the part can send a message to the sidebar application to inform the sidebar application that the part is starting up and that the part is docked on the sidebar application window. As an example, when a part is launched, the part determines what the last docking status of the part was. If the part was last docked, the part upon startup can send a message to the sidebar application indicating that it was last docked on the sidebar. An example of such a message is WM_SIDEBAR_STARTDOCKED (value 2028), where the value can be any agreed upon value.

If the part was last undocked, then upon startup, the part can communicate a message to the sidebar application indicating that it was last undocked. An example of such a message is WM_SIDEBAR_STARTUNDOCKED (value 2029)), where the value can be any agreed upon value.

Figure 6:
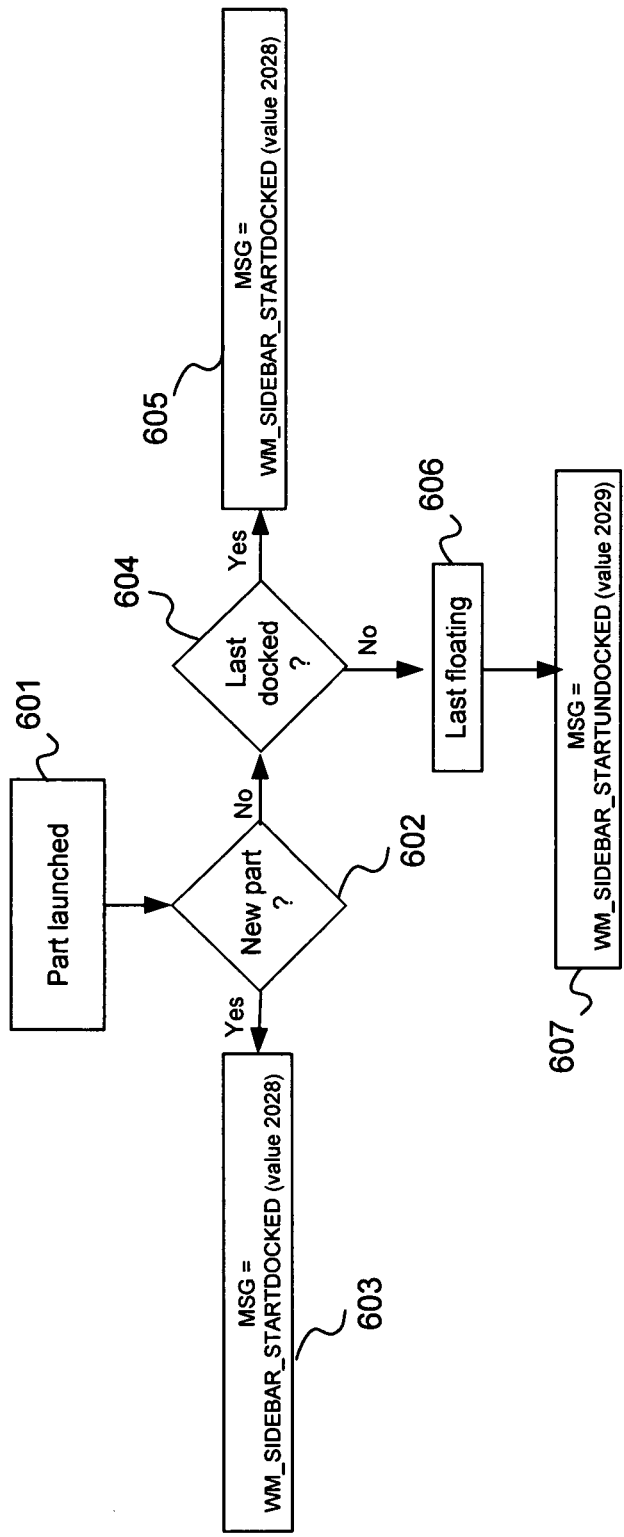
FIG. 6 is a flowchart illustrating an example of a method for a part to communicate docked or undocked status to a sidebar application according to one or more illustrative features described herein.

FIG. 6 is a flowchart illustrating an example of a method for a part to communicate docked or undocked status to a sidebar application. In STEP 601, a part is launched. If the launched part is a new part (not having been launched before—the "YES" branch of step 602), then a default state is assigned. In this example, the default is to assign a docked state. (Alternatively, the default state may be an undocked state.) Hence, the message sent by the part to the sidebar application is WM_SIDEBAR_STARTDOCKED (value 2028). If the part is not new (i.e., the part was launched before—the "NO" branch of STEP 602, then the message depends on the last status of the part. If the part was last docked (the "YES" branch of STEP 604), then the message sent by the part to the sidebar application is WM_SIDEBAR_STARTDOCKED (value 2028) (STEP 605). If the part was last floating (the "NO" branch of STEP 604 and STEP 606), the message sent by the part to the sidebar application is WM_SIDEBAR_STARTUNDOCKED (value 2029) (STEP 607).

The part can also provide an identifier and coordinates describing its window and its location. Likewise, when the part that is docked on a sidebar application window is shut down, the part can send a message to the sidebar application to inform the sidebar application that the part is shutting down. An example of such a message in the docking protocol is WM_SIDEBAR_PARTCLOSED (value 2027), where the value can be any agreed upon value. The sidebar application can then adjust the re-layout the remaining parts docked on the sidebar or take whatever action necessary to shut down the part.

If the part is moved (e.g., dragged), the part can send a message to the sidebar application to provide an identifier and window coordinates. Alternatively, the part can also wait to communicate messages to the sidebar application until after the part window overlaps with the sidebar application window if the part was not previously docked. In this example, the part can compare its window coordinates (HWIN) with window coordinates of the sidebar application. When the window coordinates overlap or intersect, then the part can send a message to the sidebar application via a docking protocol to announce that there is an overlap of the part's application window and the sidebar application window. The part may also provide its identifier to the sidebar application.

When the part application window overlaps the sidebar application window as described and is released onto the sidebar application window, the part can send a message to the sidebar application window responsive to being released on top of the sidebar application window. This message can indicate to the sidebar application window that the part application has been released onto the sidebar application. This message may further include an identifier of the part application and the window coordinates (HWIN) of the part application.

In this example, after the sidebar application receives the message from the part application that the part application has been released on top of the sidebar application window, the sidebar application can take ownership of the part application to dock the part application into the sidebar application. The sidebar application can "control" the part application at this point. This may entail many actions that the sidebar application can take in relation to the part application. For example, the sidebar application may position the part application at a designated location within the sidebar application window or resize the part application window to fit into the sidebar application window or re-position other application windows currently docked in the sidebar application window in relation to the part being docked in the sidebar application window.

In another example of the present invention, a part application is docked onto a sidebar application window after a new window for the part application is created. In this example, the part application window is moved (i.e., dragged) until it intersects the sidebar application window. The sidebar application takes control of the part application as described above. However, in this example, a new window of the part is created and the contents of the part are transferred to the new window from the old window. The old window of the part is discarded. This technique is useful for situations where ownership of an application window can only be established when the window is first created. If that is the case, creating a new window for the part will permit resetting of control to the sidebar application so that the sidebar application can alter or otherwise manipulate the window of the part.

In another example, a part is docked in the sidebar application but is being moved out of the sidebar application window. This example is shown pictorially in FIG. 5 in which a news part 203 is moved from the sidebar 206 to the desktop 201. In this example, when the part 203 is selected and is moved from the sidebar application window 206, the part 203 can send a message (via the docking protocol) to the sidebar application to inform the sidebar application that it (the part) has been removed from the sidebar. For example, the part may compare the window coordinates of the sidebar application with its own window coordinates (HWIN). When the window coordinates do not overlap (indicating the part has been removed from the sidebar), the part can send the message to the sidebar informing the sidebar that the part has been removed. The part may further provide identifier information.

The sidebar, after having received the message from the part that the part has been removed, can relinquish control of the part application. For example, the part can resize or alter its contents as the part is no longer constrained by the conventions of the sidebar application.

In an example of undocking the part from the sidebar application, the part application window is moved (i.e., dragged) out of the sidebar application window and the sidebar application relinquishes control to the part application as described above. However, in this example, a new window of the part is created and the contents of the part are transferred to the new window. The old window of the part is discarded. This technique is useful for situations where ownership of an application window can only be established when the window is first created. If that is the case, creating a new window for the part will permit resetting of control to the part application.

Figure 7:
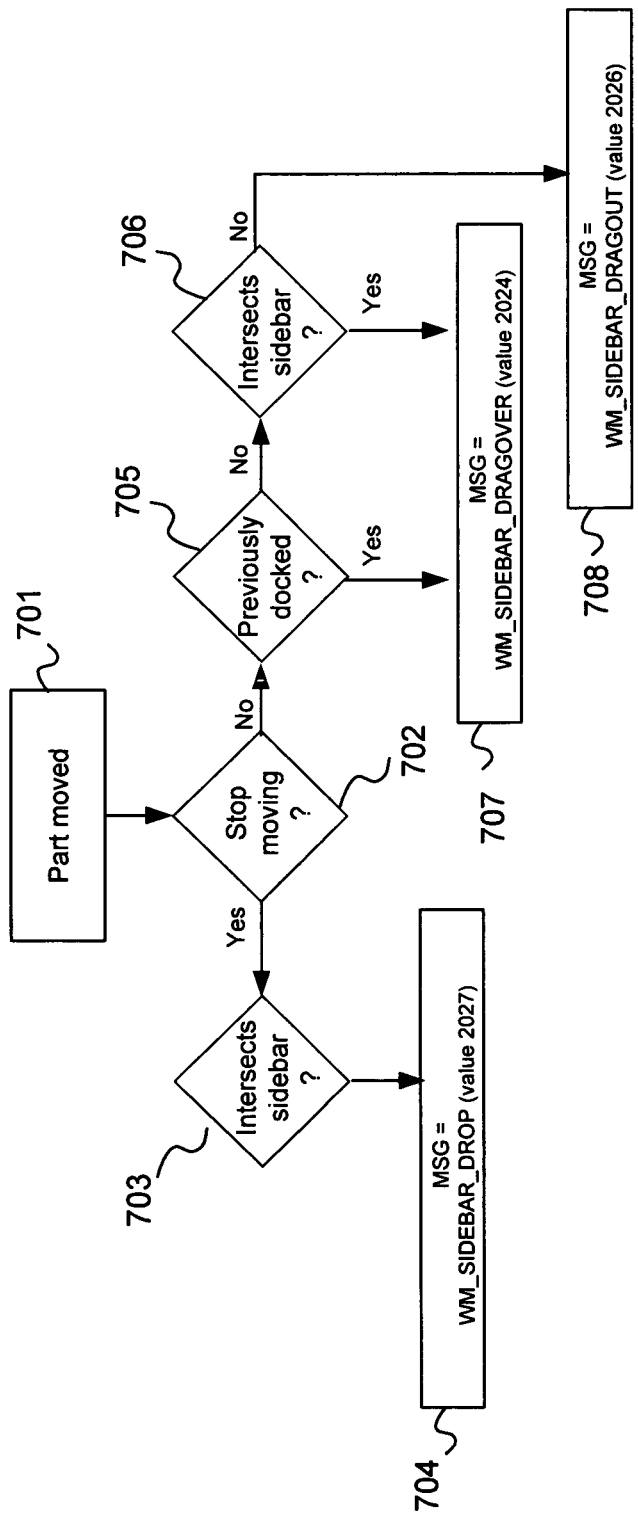
FIG. 7 is a flowchart illustrating an example of a docking protocol for moving a part and dropping a part onto a sidebar application according to one or more illustrative features described herein.

As described, the docking protocol may include messages that can be sent between the part and the sidebar applications. FIG. 7 is a flowchart illustrating an example of a docking protocol for moving a part and dropping a part onto a sidebar application. In STEP 701, a part is moved. If the movement of the part is terminated (the "YES" branch of step 702), a message is sent to the sidebar from the part if the part intersects or overlaps the sidebar ("YES" branch of STEP 703). If the part is released over the sidebar, the message sent to the sidebar application is WM_SIDEBAR_DROP (value 2027), where the value can be any agreed upon value (STEP 704).

If the part is moving (i.e., being dragged) (the "NO" branch of STEP 702) and was previously docked on the sidebar ("YES" branch of STEP 705), then the message sent from the part to the sidebar application is WM_SIDEBAR_DRAGOVER (value 2024), where the value can be any agreed upon value (STEP 707). If the part is moving (i.e., being dragged) (the "NO" branch of STEP 702) and was not previously docked ("NO" branch of STEP 705 and does not now intersect the sidebar ("NO" branch of STEP 706, then the message from the part to the sidebar is WM_SIDE-BAR_DRAGOUT (value 2026), where the value can be any agreed upon value (STEP 708). If the part is moving (i.e., being dragged) (the "NO" branch of STEP 702), was not previously docked ("NO" branch of STEP 705, and now intersects the sidebar ("YES" branch of STEP 706), then the message from the part to the sidebar is WM_SIDE-BAR_DRAGOVER (value 2024).

Also, in another example of the present invention, a method is provided for indicating docking of a part on an application window or undocking a part from an application window. When a part is dragged to a sidebar, for example, to be docked on the sidebar, the docking of the part can be graphically indicated to the user so that the user can more easily conceptualize the result of his or her drag and drop operation. In this way, the user would be apprised of the fact that the part is now docked to the sidebar. Likewise, when a part is removed from the sidebar, the undocking of the part can also be graphically indicated to the user such that the user would be aware of the undocking.

Figure 8D:
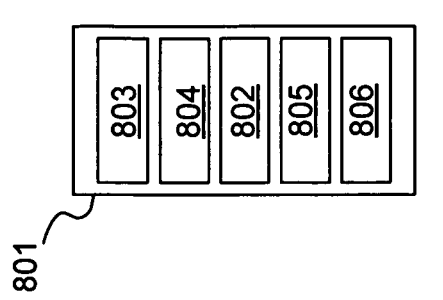
FIGS. 8A-8D illustrate an example of an animation to indicate docking of a part in a sidebar according to one or more illustrative features described herein.
Figure 8C:
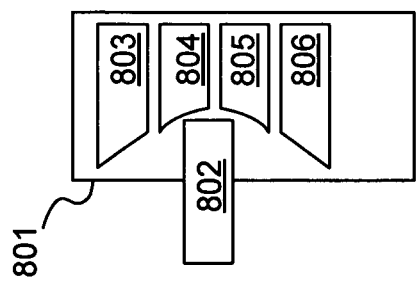
Figure 8B:
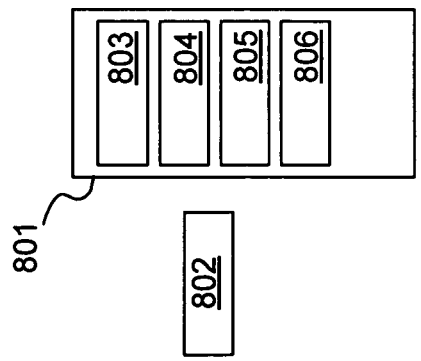
Figure 8A:
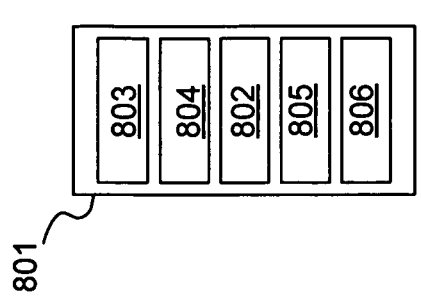

In one example, the sidebar application can display an animation to designate docking or undocking of the part in the sidebar. This animation may take many forms. An example of an animation to graphically indicate docking of a part is provided in FIGS. 8A-8D, which illustrate an example of an indication of the docking of a part on an application window such as a sidebar. FIG. 8A illustrates a sidebar 801 that contains four parts (803, 804, 805, and 806). A fifth part 802 is free-floating next to the sidebar 801. In FIG. 8B, the free-floating part 802 is moved into the sidebar 201 area to dock the part 802 into the sidebar 801. The parts (803, 804, 805, and 806) that are already docked in the sidebar are displayed in a deformed configuration to indicate that the part 802 is being moved into the sidebar and being docked into the sidebar 801. FIG. 8C shows that the part 802 has been partially moved further into the sidebar 801 between part 804 and part 805. Part 804 and part 805 are deformed to indicate the insertion of part 802 between part 804 and part 805. Because part 802 has been moved further into the sidebar 801, pars 803 and 806, which do not abut part 802, are no longer deformed and are displayed in their original state. FIG. 8D illustrates part 802 fully docked onto the sidebar 801 between parts 804 and 805. All of the parts that were originally docked on the sidebar 801 (parts 803, 804, 805, and 806) have returned to their original non-deformed appearance. Hence, the docking of part 802 is indicated to the user such that the user would be informed of the docking of the part.

Likewise, a display animation can be used to indicate the undocking of a part from a sidebar. FIGS. 9A-9F illustrate an example of undocking a part from a sidebar. In FIG. 9A, a sidebar 801 is illustrated containing five parts (802-806) docked on the sidebar. FIG. 9B shows one of the parts (802) being moved away from the sidebar 801. For example, a user can click and drag part 802 away from the sidebar causing the part 802 to become misaligned with the other parts (803, 804, 805, and 806) that are docked on the sidebar (801). As FIG. 9B illustrates, as part 802 is dragged away from the sidebar 801, the side of the sidebar over which part 802 is dragged becomes deformed to indicate passage of the part 802. In FIG. 9C, part 802 is further dragged away from the sidebar 801. As part 802 is dragged further away from alignment with the other parts (803, 804, 805 and 806) that are docked on the sidebar (801), the side of the sidebar 801 over which part 802 becomes further deformed. In this example, the side of the sidebar 801 over which part 802 is being moved shows the appearance of a "rubber-band" being stretched. FIG. 9D illustrates part 802 being dragged a certain threshold distance from the sidebar 801 such that the side of the sidebar 801 over which part 802 has been moved partially returns to its original position. In this example, the side of the sidebar (801) shows a loose, wave-like appearance much like a rubber band being released from a taut state. This recoil appearance of the side of the sidebar 801 indicates visually that the part 802 is being undocked from the sidebar 801.

In FIG. 9E, part 802 is further removed from the sidebar 801. In this example, the part 802 is continued to be moved away from the sidebar 801. The side of the sidebar 801 over which part 802 was moved continues to appear to recoil in response to being "released" by the undocking part 802. As FIG. 9E illustrates, the side of the sidebar 801 exhibits an appearance of "elastic recoil" in response to undocking of the part 802.

In FIG. 9F, part 802 remains undocked from the sidebar 801 while the other parts (803, 804, 805, and 806) that are still docked in the sidebar 801 can be rearranged within the sidebar 801 (e.g., the parts may be shifted up to account for the space released by part 802). This rearrangement can be automatic or user-initiated. As FIG. 9F illustrates, the parts still docked in the sidebar 801 are realigned with each other while 802 is no longer docked in the sidebar 101. The side of the sidebar 801 over which part 802 passed also returns to its original conformation indicating that part 802 has been successfully undocked from the sidebar 801.

As FIG. 8 illustrates, a part 802 is dragged over a sidebar application window 801. The sidebar application window displays other parts (803, 804, 805, and 806) that are docked in the sidebar application window 801. As the part 802 is dragged onto the sidebar application window 801, the parts already docked on the sidebar application window 801 that are adjacent to the incoming part 802 are displayed in a deformed state. This provides the appearance of resistance of entry of the part 802 onto the sidebar application window 801.

It is understood that aspects of the present invention can take many forms and embodiments. The embodiments shown herein are intended to illustrate rather than to limit the invention, it being appreciated that variations may be made without departing from the spirit of the scope of the invention. Although illustrative embodiments of the invention have been shown and described, a wide range of modification, change and substitution is intended in the foregoing disclosure and in some instances some features of the present invention may be employed without a corresponding use of the other features. Accordingly, it is appropriate that the appended claims be construed broadly and in a manner consistent with the scope of the invention.

We claim:

1. A method of providing information in an application window via a graphical user interface of an operating system of a computing device, said graphical user interface providing a desktop window corresponding to the operating system, a first application window displayed in the desktop window, said first application window corresponding to a first application, a second application window displayed in the desktop window, said second application window corresponding to a second application, and a third application window displayed in the desktop window, said third application window corresponding to a third application docked within the second application window, said method comprising:

launching a first application for execution on the computing device, said first application displaying information in the first application window, wherein launching the first application includes sending, by the first application, a docking status message to the second application, said docking status message indicating a last docking status of the first application window, such that the last docking status indicates if the first application window was previously docked within the second application window during a previous execution of the first application on the computing device;

in response to the receipt of the docking status message indicating the last docking status, docking the first application window within the second application window when the last docking status comprises a previously docked message indicating that the first application window was previously docked within the second application window during the previous execution of the first application and not docking the first application window within the second application window when the last docking status comprises a not previously docked message indicating that the first application window was not previously docked within the second application window during the previous execution of the first application;

receiving, by the second application, a movement message from the first application indicating movement of the first application window in relation to the second application window, wherein the movement message includes an identifier associated with the first application and coordinates, said coordinates describing the first application window and the location of first application window; and in response to the receipt of the movement message indicating movement from the first application, docking the first application window within the second application window when the coordinates included in the received movement message indicate that the first application window overlaps at least a portion of the second application window, wherein docking the first application window within the second application window includes displaying an animation indicating that the first application window is overlapping the second application window, and wherein said displaying an animation includes displaying an animated deformation of a border of the second application window and displaying an animated deformation of the third application window docked within the second application window, said displaying of animated deformations in response to the position of the first application window in the second application window.

2. The method of claim 1 wherein the second application is a sidebar and the first application is a part executable in the sidebar.

3. The method of claim 2 wherein the previously docked message consists of WM_SIDEBAR_STARTDOCKET and wherein the not previously docked message consists of WM_SIDEBAR_STARTUNDOCKET.

4. The method of claim 1 wherein when the first application window overlaps at least a portion of the second application window and the movement message comprises WM_SIDEBAR_DROP.

5. The method of claim 1 wherein the first application was previously docked on the second application and the docking status message comprises WM_SIDEBAR_DRAGOVER.

6. The method of claim 1 wherein the first application was not previously docked on the second application and the first application window does not overlap the second application window.

7. The method of claim 6 wherein the docking status message comprises WM_SIDEBAR_DRAGOUT.

8. The method of claim 1 further comprising sending a message from the first application to the second application and the first application window overlaps the second application window, the message comprising WM_SIDEBAR_DRAGOVER.

9. The method of claim 1 wherein the displaying step includes passing control of the first application to the second application.

10. The method of claim 9 wherein passing control includes creating a new window for the first application, the new window including content from the first application window and wherein passing control further includes deleting said first application window.

11. The method of claim 1 further comprising after the displaying step, moving the first application window away from the second application window.

12. The method of claim 11 wherein moving the first application window away from the second application window includes copying content of the first application window into a new window of the first application and deleting the first application window.

13. The method of claim 1 wherein moving the first application window includes moving the first application window out of the second application window in a move direction and wherein said displaying an animation includes displaying a lateral displacement of a border of the second application window in the move direction when the first application window abuts the border of the second application window and displaying a lateral displacement of the border of the second application window in a direction opposite to the move direction when the first application window substantially passes the border of the second application window during the step of moving.

14. A method of providing information in an application window via a graphical user interface of an operating system of a computing device, said graphical user interface providing a desktop window corresponding to the operating system, a first application window displayed in the desktop window, the first application window corresponding to a first application, and a second application window displayed in the desktop window, said second application window corresponding to a second application, said method comprising:

displaying the first application window within the second application window, said second application window displayed in the desktop window, said second application owning the first application window, wherein the second application controls the display of the first application window when the first application window is displayed within the second application window;

determining, by the first application, that the first application window does not overlap the display of the second application window by determining movement of the first application window in relation to the second application window and comparing the window coordinates of the first application window to the window coordinates of the second application window, in response to determining the first application window does not overlap the display of the second application window, sending, by the first application, a control request message to the second application indicating to the second application that the position of the first application window has been removed from within the location of the second application window;

receiving, by the second application, the control request message from the first application;

in response to the received control request message, relinquishing, by the second application, the control of the first application window, said relinquishing comprising:

creating a new first application window for the first application within the desktop window, wherein the first application owns the new first application window;

determining the new first application window is not overlapping the second application window;

copying, by the second application, the contents of the first application window within the second application window into the new first application window of the first application; and deleting, by the second application, the first application window within the second application window.

15. A method of providing information in an application window via a graphical user interface of an operating system, said graphical user interface providing a desktop window corresponding to the operating system, a first application window displayed in the desktop window, said first application window corresponding to a first application, and a second application window displayed in the desktop window, said second application window corresponding to a second application, said method comprising:

launching a first application for execution, said first application displaying information in the first application window;

in response to the launching of the first application, sending, by the first application, a docking status message to the second application, said second application having a corresponding second application window displayed in a desktop window, the docking status message indicating a last docking status of the first application window in relation to the second application window, such that the last docking status indicates if the first application window was previously docked within the second application window during a previous execution of the first application, wherein the first application window is docked within the second application window when the last docking status comprises a previously docked message indicating that the first application window was previously docked within the second application window during a previous execution of the first application, said docking comprising:

identifying an overlap of at least a portion of the first application window with the second application window;

passing control of the first application window to the second application;

creating, by the second application, a new application window for the first application in the second application window;

copying, by the second application, the contents of the first application window into the new application window of the second application; and deleting, by the second application, the first application window;

sending, by the first application, a movement message to the second application while the first application window is being moved in relation to the second application window, the movement message indicating a first moving status if the first application window was not previously docked to the second application and the first application window does not overlap the second application window, otherwise the movement message indicating a second moving status;

sending, by the first application, a release message to the second application after the first application window has been moved if the first application window overlaps at least a portion of the second application window, the release message identifying the first application and indicating that the first application window has been released onto the second application window, wherein the first application window is docked to the second application window responsive to said release message, said docking comprising:

identifying an overlap of at least a portion of the first application window with the second application window;

passing control of the first application window to the second application;

creating, by the second application, a new application window for the first application in the second application window;

copying, by the second application, the contents of the first application window into the new application window of the first application; and deleting, by the second application, the first application window.

* * * * *